UNITED STATES PATENT OFFICE.

EMIL COLLETT, OF CHRISTIANIA, NORWAY, ASSIGNOR TO NORSK HYDRO-ELEKTRISK KVAELSTOFAKTIESELSKAB, OF CHRISTIANIA, NORWAY.

PROCESS OF CONCENTRATING DILUTE NITRIC ACID.

1,154,289.  Specification of Letters Patent.  Patented Sept. 21, 1915.

No Drawing.   Application filed March 27, 1913.   Serial No. 757,252.

*To all whom it may concern:*

Be it known that I, Dr. EMIL COLLETT, a subject of the King of Norway, residing at Solligaten 7, Christiania, Norway, have invented certain new and useful Improvements in Processes of Concentrating Dilute Nitric Acid; and I do hereby declare the following to be a full, clear, and exact description of the invention, such as will enable others skilled in the art to which it appertains to make and use the same.

This invention relates to the concentration of acids by boiling the acid in distillation vessels and introducing the acid vapors into a drying tower charged with a drying agent such as concentrated sulfuric acid and has for its object a process by which certain disadvantages connected with the processes hitherto employed are avoided. When processes of the type above referred to are employed for the purpose of concentrating nitric acid one may employ for the drying operation an apparatus as that described in the United States Patent No. 517,098. By working in this known manner it has been found however, that it is difficult to regulate the temperature in such manner that the result aimed at is obtained. The temperature is liable to rise too high. It is therefore necessary to arrange the drying in such manner that one may have it in one's power to regulate the temperature. The applicant has found that such a regulation of the conditions of temperature may be easily effected, when for instance not the whole amount of sulfuric acid necessary for the process is introduced at the top of the tower in a heated condition but when part of it is introduced at a lower point and with a comparatively low temperature. The same result is obtained by introducing a quantity of cold nitric acid or a mixture of cold nitric acid and sulfuric acid at a suitable point in the tower.

The process according to this invention may for instance be carried out in connection with the use of a concentration column of known construction charged with concentrated sulfuric acid, which according to the circumstances may be more or less strongly heated. The nitric acid vapors (having a concentration of for instance 65 per cent.) from the distillation vessel are introduced at the bottom of the apparatus. At the point of the apparatus, where it has been found by experience that the highest temperature prevails, or at a point which has by experiments been found to be suitable, regulated quantities of the drying and cooling agent (sulfuric acid) are now at the same time introduced during the process.

By regulating in a suitable manner the amount and temperature of the drying agent introduced at this point, the temperature in the drying apparatus can easily be maintained within the limits desired. One may also at this point instead of cold sulfuric acid introduce a quantity of nitric acid, which must then have a rather high concentration in order, that its content of water shall not in contact with the sulfuric acid evolve injurious heat and thus counteract the cooling action. If one does not desire to introduce concentrated nitric acid one may introduce a cooled mixture of both mineral acids, sulfuric acid and nitric acid.

I claim—

1. The process of concentrating dilute nitric acid, which comprises vaporizing said acid, introducing the vapors into a drying apparatus, introducing a drying agent at the top of the apparatus, and introducing a cooling agent into said apparatus between the point where the vapors enter the latter and the point where the vapors escape.

2. The process of concentrating dilute nitric acid, which comprises vaporizing said acid, introducing the vapors into a drying apparatus, and introducing a cooling agent into said apparatus between the point where the vapors enter the latter and the point where the vapors escape, and regulating the amount and temperature of the drying agent to maintain the temperature in the drying zone at the desired degree.

3. The process of concentrating dilute nitric acid, which comprises vaporizing said acid, introducing the vapor into a drying apparatus, and introducing cold sulfuric acid into the drying apparatus between the point where the vaporized nitric acid enters the latter and the point where the vapors escape.

4. The process of concentrating dilute nitric acid, which comprises vaporizing said acid, introducing the vapors into a drying apparatus, and introducing cold sulfuric acid into the drying apparatus between the point where the vaporized nitric acid enters the latter and the point where the vapors escape, and regulating the amount and temperature of the sulfuric acid to maintain the temperature in the drying zone at the desired degree.

5. The process of concentrating dilute nitric acid, which comprises vaporizing said acid, introducing the vapors into a drying apparatus, and introducing a mixture of cold sulfuric acid and nitric acid into the drying apparatus between the point where the vaporized nitric acid enters the latter and the point where the vapors escape.

6. The process of concentrating dilute nitric acid, which comprises vaporizing said acid, introducing the vapors into a drying apparatus and introducing mineral acid having both a drying and cooling action on the nitric acid vapors into said apparatus between the point where the nitric acid vapors enter and the point where they escape, and regulating the amount and temperature of the said mineral acid to maintain the temperature of the drying zone at the desired degree.

7. The process of concentrating dilute nitric acid, which comprises vaporizing said acid, introducing the vapors into a drying apparatus and maintaining a cooling action in said apparatus by suitable means at the zone of highest temperature produced by the drying operation by introducing in the path of the vapors in said zone a liquid cooling agent which does not prejudicially affect the concentration of the vapors being dried.

In testimony that I claim the foregoing as my invention, I have signed my name in presence of two subscribing witnesses.

EMIL COLLETT.

Witnesses:
  M. E. CULTORENSEN,
  RUTH LINDSTRÖM.

Copies of this patent may be obtained for five cents each, by addressing the "Commissioner of Patents Washington, D. C."